US009258141B2

(12) United States Patent
Draznin (10) Patent No.: US 9,258,141 B2
(45) Date of Patent: Feb. 9, 2016

(54) SUPPLEMENTAL MOBILE COMMUNICATION DEVICE

(75) Inventor: Sagiv Draznin, Walnut Creek, CA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 1186 days.

(21) Appl. No.: 12/650,651

(22) Filed: Dec. 31, 2009

(65) Prior Publication Data

US 2011/0158408 A1 Jun. 30, 2011

(51) Int. Cl.
*H04K 1/00* (2006.01)
*H04W 40/00* (2009.01)
*H04L 12/54* (2013.01)

(52) U.S. Cl.
CPC .................................. *H04L 12/5692* (2013.01)

(58) Field of Classification Search
USPC .................... 380/270, 235; 455/445, 422.1
See application file for complete search history.

(56) References Cited

U.S. PATENT DOCUMENTS

| 6,493,556 | B1* | 12/2002 | Stinson | H04B 7/1856 455/12.1 |
| 2005/0003830 | A1* | 1/2005 | Campbell | 455/456.1 |
| 2007/0105498 | A1* | 5/2007 | Steudle et al. | 455/41.2 |
| 2007/0248230 | A1* | 10/2007 | Shevmov et al. | 380/270 |
| 2008/0064443 | A1* | 3/2008 | Shin et al. | 455/558 |
| 2010/0235550 | A1* | 9/2010 | Bolton et al. | 710/62 |
| 2010/0291947 | A1* | 11/2010 | Annamalai | 455/456.1 |
| 2013/0250769 | A1* | 9/2013 | Karaoguz | H04L 45/00 370/235 |

OTHER PUBLICATIONS

Cost models for Next Generation Networks with Quality of Service parameters, De Lope et al, IEEE, 2008.*
Pricing for Wireless Mesh Networks under Two Access Point Competition, Zhu et al, IEEE, 2008.*
Differentiated Quality of Service in Survivable WDM Mesh Networks, Sebbah et al, IEEE 2009.*

* cited by examiner

*Primary Examiner* — Luu Pham
*Assistant Examiner* — Jahangir Kabir (57) ABSTRACT

Systems and methods provide a supplemental mobile communication device that allows use of a host communication device with a network different from that associated with the host device, e.g., a network of a different service provider or that is otherwise restricted to the host device. The system may include a supplemental mobile communication device having a transmitter selectively communicating with a plurality of host devices associated with a different wireless network. The system may further include a processor configured to compare a service plan associated with the supplemental mobile communication device with a service plan associated with the host device, and selectively route communications initiated by a user interface of the host device through one of the first and second communication networks based upon at least the comparison of the first and second service plans.

22 Claims, 4 Drawing Sheets

SUPPLEMENTAL MOBILE COMMUNICATION DEVICE

BACKGROUND

Communication service providers invest in the communication networks they provide to their customers in order to ensure high quality voice and data transmission. However, differences in quality and performance between the networks of service providers may not be apparent to customers who do not have previous experience or access to quality and/or performance data regarding the networks. Furthermore, the rapid expansion of wireless networks has resulted in a large number of first-time users and customers who have little knowledge of performance and quality differences between wireless networks. Accordingly, it is difficult for service providers to gain a clear marketing advantage based upon network performance alone.

By contrast, new communication devices used on these networks are proliferating rapidly and are often accompanied by comprehensive advertising campaigns that bring a great deal of attention to the new features and advantages offered by each of the devices. Accordingly, communication service providers have recently employed the strategy of pursuing exclusive agreements with manufacturers of certain communication devices to distinguish themselves from competitors in the marketplace. Accordingly, the market for new communication devices such as wireless smartphones is rapidly expanding as manufacturers try to develop the most popular devices that will bring the greatest value to such agreements.

Many service providers may typically pair new devices with contractual obligations that require the customer to purchase a service contract for a defined period of time, perhaps even several years, thereby guaranteeing the service provider a revenue stream for at least the life of the contract. While demand for new devices may generally be sufficient enough that a significant number of customers are nonetheless willing to agree to such terms in order to obtain the newest and best devices, many of the customers eventually wish to purchase a newer device before their service contract ends. These customers are usually limited to the selection offered by their service provider in order to avoid substantial penalty fees for early cancellation of their service contract.

Accordingly, many customers would prefer to be able to use new communication devices offered by different service providers on other networks available to them, for example those provided by service providers with which they already have an active service plan.

DETAILED DESCRIPTION

Various exemplary illustrations are provided of systems and methods for providing a supplemental mobile communication device that allows use of a host communication device with a network different from that associated with the host device, e.g., a network of a different service provider or that is otherwise restricted to the host device. An exemplary system includes a supplemental mobile communication device having a transmitter that is configured to selectively communicate via a wireless network, and an adapter that is in communication with the transmitter, where the adapter is configured to selectively allow communication between the transmitter and a plurality of host devices associated with a different wireless network. The system may further include a processor configured to compare a service plan associated with the supplemental mobile communication device with a service plan associated with the host device, and selectively route communications initiated by a user interface of the host device through one of the first and second communication networks based upon at least the comparison of the first and second service plans.

An exemplary method includes receiving an initiated communication from a host device at a supplemental mobile communication device associated with a first mobile communication network. The initiated communication is initiated by a user interface of the host device, which is associated with a host communication network. The exemplary method further includes comparing a service plan associated with the host device with a service plan associated with the supplemental mobile communication device, and selectively routing the initiated communication through one of the host communication network and the wireless communication network based upon at least the comparison of the first and second service plans.

Figure 1:
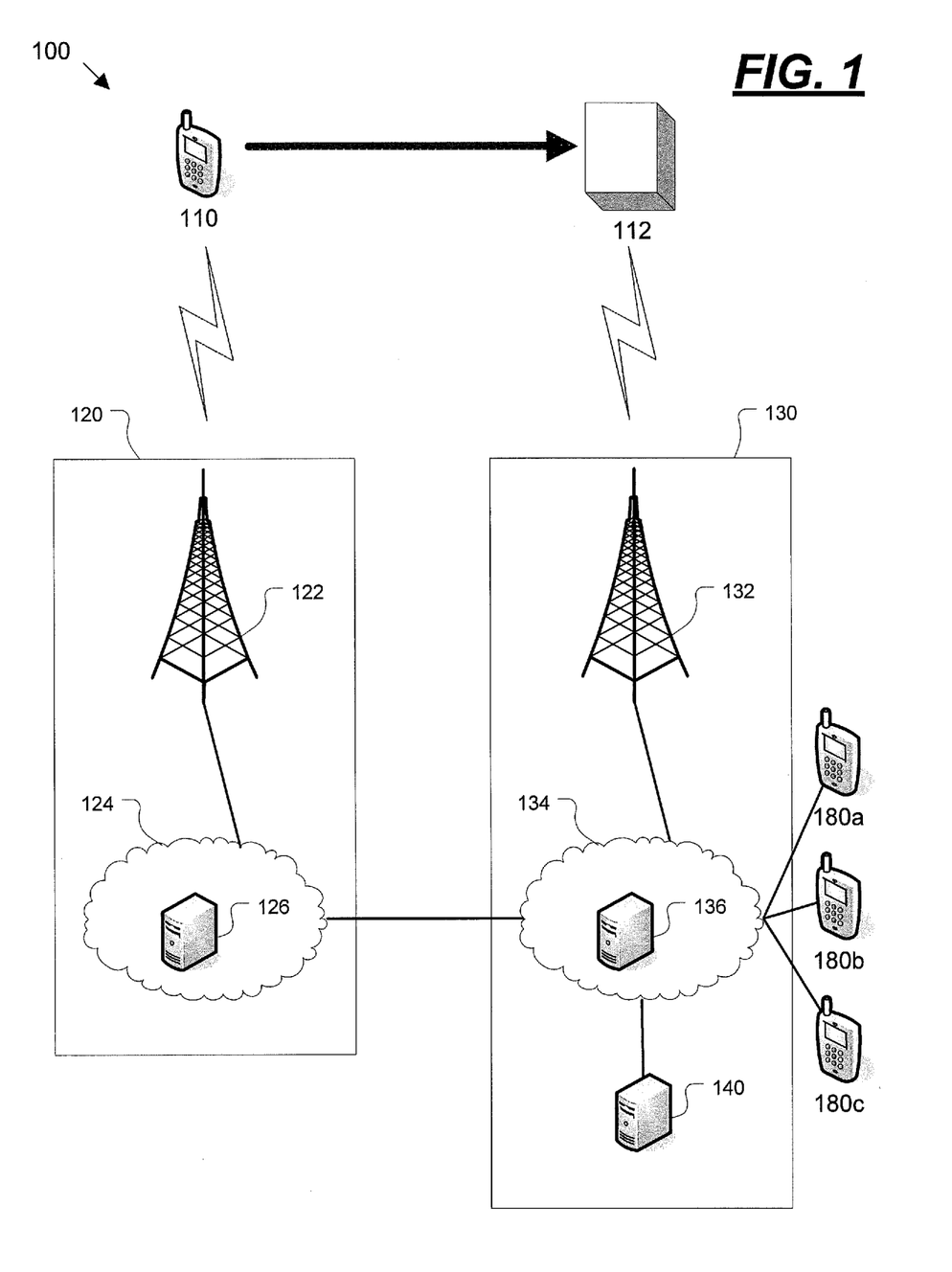
FIG. 1 is a schematic illustration of an exemplary communication network.

FIG. 1 illustrates an exemplary system 100 for allowing communication and/or transmission of data between mobile devices. System 100 includes a plurality of mobile devices 110 that are associated with at least a first wireless network 120. The system 100 further includes a supplemental mobile device 112 that is associated with a second wireless network 130.

The first wireless network 120 and second wireless network 130 may be, for example, CDMA wireless networks, GSM wireless networks, or any other known network configuration. As illustrated in FIG. 1, each wireless network 120, 130 typically includes a base station 122, 132, a telecommunications network 124, 134, and a telecommunications server 126, 136. The networks 120, 130 may each be associated with different service providers, such that mobile device 110 is generally unable to register with or communicate directly via network 130. Similarly, supplemental mobile device 112 is generally unable to communicate via network 120. Typically, the mobile device 110 and supplemental mobile device 112 each register with an available network associated with their respective service provider, such as wireless network 120 and wireless network 130, as may be allowed by each respective service provider. While a single network is shown for each service provider, a service provider associated with the mobile device 110 and supplemental mobile device 112 may provide a number of distinct networks upon which the mobile device 110 and supplemental mobile device 112 may operate.

Mobile device 110 generally operates by accessing a respective base station 122 in the first network 120, e.g., that communicates with a telecommunications network 124 allowing the mobile device 110 to conduct various voice and data communications with other devices, such as a remote telephone, computer, telecommunications server 126, etc. Similarly, supplemental mobile device 112 may generally operate by accessing a base station 132 of the second wireless network 130 that communicates with a telecommunications network 134, allowing supplemental mobile device 112 to conduct various voice and data communications with other devices, such as a remote telephone, computer, telecommunications server 136, etc. While only a single base station 122, 132, telecommunications network 124, 134, and telecommunications servers 126, 136 are illustrated within each of the networks 120, 130, each network 120, 130 may include a large number of base stations, telecommunications networks, and servers that extend across cities, states, or even countries. Accordingly, no numerical or geographical limitation should be implied to system 100. Additionally, while one mobile device 110 is illustrated, a large number of different mobile devices 110 may be associated with any communication network, e.g., network 120.

Mobile device 110 is typically any wireless device capable of facilitating voice and/or data communications over wireless network 120. For example, mobile device 110 can be a cellular phone, a personal digital assistant, a handled computer, a laptop, or the like. Mobile device 110 is typically capable of utilizing more than one wireless communication protocol in order to access different types of wireless networks. For example, mobile device 110 can be any device that can communicate voice or data over a wireless network 120, such as by communicating with base station 122 using code division multiple access (CDMA), time division multiple access (TDMA), global system for mobile communications (GSM), a Universal Mobile Telecommunication System (UMTS), a Long Term Evolution (LTE), or the like. Additionally, mobile device 110 can also communicate with various devices using such wireless protocols as Bluetooth, WiFi (i.e. IEEE 802.11), ZigBee, Z-Wave, or any other wireless communication protocol.

The supplemental communication network 130 may also include a supplemental mobile communication device server 140. As will be described further below, the server 140 generally facilitates communication of a host device, e.g., mobile device 110, via a network other than that allowed by the service provider of the network with which the host device is associated. For example, as will be described further below, the supplemental mobile communication server 140 may facilitate initiated communications, e.g., a phone call, from the mobile device 110 via the network 130 when the mobile device 110 is connected to the supplemental mobile device 112. Thus, the server 140 may generally provide a platform for or otherwise generally support data or processes associated with allowing a host device to communicate via a network that is not associated with the host device, e.g., mobile device 110 via network 130. For example, the server 140 may store communication parameters for supplemental mobile device 112 and a number of given mobile devices that may serve as host devices for the supplemental mobile device 112. These parameters may be provided, for example, by users associated with the supplemental mobile device 112 who wish to use certain host devices with the supplemental mobile device 112.

Mobile device 110 generally communicates with a base station 122 that is within a certain proximity of mobile device 110. Base station 122 typically transmits communication signals from mobile device 110 to a Mobile Telephone Switching Office (MTSO) or packet data node (PDN). Each MTSO/PDN is associated with one or more base stations 122, 132, and each typically handles communications for a plurality of mobile devices 110. Typically, mobile device 110, base stations 122, 132, or the MTSO/PDN will periodically communicate with a telecommunications server 126, 136.

Mobile device 110 is typically capable of communicating voice and/or data with another device by accessing network 120 or 130. Typically, mobile device 110 communicates with networks 120 or 130 through base stations 122, 132 using one of any number of different wireless communication technologies. Typically, mobile device 110 is capable of communicating with both networks 120, 130. For example, mobile device 110 may include a wireless communication system that is capable of tuning into different radio frequencies used by different types of wireless networks 120, 130, and also capable of utilizing different wireless communication protocols. Mobile device 110 may also be capable of communicating with both networks 120, 130 simultaneously over different operating frequencies and using different wireless protocols. Mobile device 110 is generally capable of tuning into one or more radio frequencies. For example, mobile device 110 may include two or more radios, enabling mobile device 110 to simultaneously communicate with wireless networks 120, 130.

Telecommunications networks 124, 134 typically include both wired and wireless communication networks, and facilitate voice and data communications between various devices, including mobile device 110. For example, telecommunications networks 124, 134 typically facilitate voice and/or data communications between multiple mobile devices 110, telephones, computers, etc. Telecommunications networks 124, 134 may connect to and/or include a Public Switched Telephone Network (PSTN), a wireless network, satellite communications, or any other network/equipment used to facilitate voice and/or data communications, allowing mobile device 110 to communicate with other devices, and possibly also facilitating communications between telecommunications servers 126, 136 and mobile device 110.

Telecommunications networks 124, 134 may include, but are not limited to, one or more Voice over Internet Protocol ("VoIP") networks, Public Switched Telephone Networks ("PSTNs"), overlay VoIP networks (e.g., a VoIP network overlaid on a PSTN), wireless communication networks (e.g., cellular telephone or satellite pager networks), wireline networks, packet-switched networks, circuit-switched networks, or any combination or subset of the above-listed networks. Telecommunications networks 124, 134 may be configured to carry one or more types of communication signals, including, but not limited to, Internet Protocol signals (i.e., IP-based signals), Time Division Multiplexing (TDM) signals, Session Initiation Protocol (SIP) signals, PSTN signals, wireless signals (e.g., Code Division Multiple Access (CDMA), Time Division Multiple Access (TDMA), and Global System for Mobile communication (GSM) signals), voice signals, and any other communication signals. As further illustrated in FIG. 1, telecommunication networks 124, 134 are typically connected to one another, either directly as shown in FIG. 1, or possibly through one or more other intermediary networks, such as through the Internet, a PSTN, etc.

Telecommunications servers 126, 136 and supplemental mobile communication server 140 can be any type of computing device that typically includes a processor, a memory, and a computer-readable medium. Servers 126, 136, 140 may also include one or more databases for managing data. The supplemental mobile device 112 may also include a processor and/or computer-readable medium.

The system 100 and supplemental mobile device 112 generally facilitate the communication of a user via a host device, e.g., mobile device 110, via one or more networks, e.g., network 130, that the host device itself is not authorized or otherwise capable of registering with to transmit or receive data or other communications. Moreover, as will be described further below, the system 100 may allow for the selective use of the networks associated with the mobile device 110 and supplemental mobile device 112, respectively. More specifically, once the mobile device 110 is connected with supplemental mobile device 112, a user may be provided the option of communicating via the network 120 associated with the mobile device or the network 130 associated with the supplemental mobile device 112.

The supplemental mobile device 112 and/or supplemental server 140 may also be configured to compare a service plan associated with the supplemental mobile device 112 with a service plan associated with a host device, e.g., mobile device 110, thereby allowing a user to determine which of the networks 120, 130 available should be used according to a variety of parameters, e.g., cost, network performance, service availability, etc. A user or administrator associated with the mobile device 110 and/or supplemental mobile device 112 may provide service plan information associated with the mobile device 110 and the supplemental mobile device 112 to the supplemental device server 140, thereby allowing the server 140 to directly compare the service plans and usage patterns to determine which of the available networks 120, 130 would be least costly to use. Other parameters may be utilized in this determination as well, e.g., network performance given a location of the mobile device 110 and/or supplemental mobile device 112 at the time of the request, service limitations associated with either plans such as availability of advanced network features, etc.

Additionally, as will be described further below, the system 100 may allow the supplemental mobile device 112 to encrypt communications or data exchanges transmitted from the supplemental mobile device 112 via network 130. Accordingly, the system 100 and/or supplemental device server 140 may allow for encryption of communications initiated with a host device such as mobile device 110, where the communications are initiated by the user interface 150 and transmitted via the supplemental mobile device 112 and/or network 130.

Encryption of communications between the supplemental mobile device 112 and the network 130 may be accomplished in any manner that is convenient. For example, the supplemental device server 140 and/or supplemental mobile device 112 may use an encryption key or scheme stored by the server 140 or the supplemental mobile device 112 itself. Multiple keys or encryption schemes may be provided to ensure security, and may be indicated by, for example, an identity provided by a device, e.g., a certain one of device 180, with which the supplemental mobile device 112 is communicating. More specifically, devices 180a, 180b, 180c (collectively, 180) with which the supplemental mobile device 112 wishes to communicate in an encrypted manner may be registered or stored by the supplemental device server 140. Encryption keys and schemes for encrypting communications sent from the supplemental mobile device 112 via the network 130 may thus be stored on the supplemental device server 140. Alternatively, encryption keys may be stored directly on the supplemental mobile device 112. In examples where encryption keys are stored directly on the supplemental mobile device 112, copies of these encryption keys may be provided on any other devices 180 with which encrypted communication is desired.

Encryption keys may generally be retrieved by the supplemental mobile device 112 and any other devices (not shown) with which the supplemental mobile device 112 communicates in order to allow the supplemental mobile device 112 and the other device to communicate. For example, each of the supplemental mobile device 112 and other communication devices, e.g., mobile devices 180, may download an encryption key from the supplemental device server 140. Furthermore, different encryption codes may be employed for each device registered for encryption. Accordingly, when a communication, e.g. a phone call, is initiated from supplemental mobile device 112 to one of the other devices 180, a device, e.g., one of the other devices receiving the call, may confirm an identity, e.g., a phone number, internet protocol address, etc., of the supplemental mobile device 112 and retrieve the appropriate encryption key. Similarly, when a communication, e.g., a phone call is initiated from one of the other devices 180 to the supplemental mobile device 112, the supplemental mobile device 112 may confirm the identity of the device from which it is receiving the communication, and retrieve the appropriate encryption key.

Figure 2A:
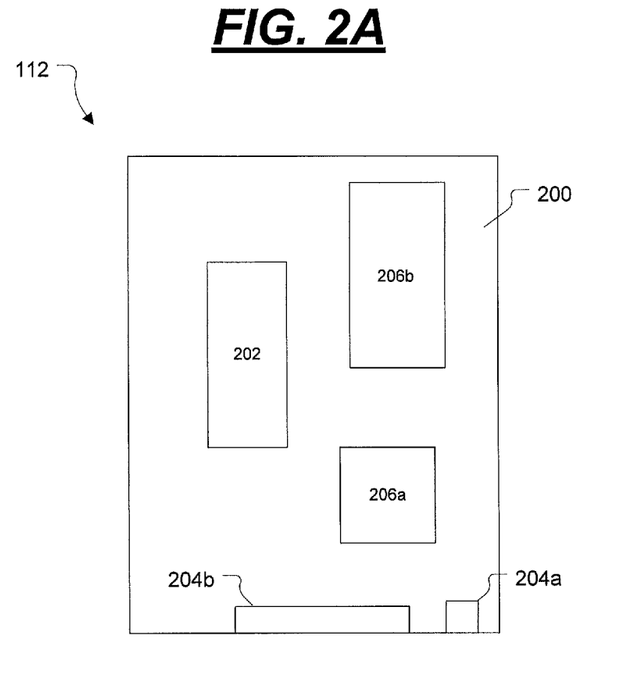
FIG. 2A is a schematic illustration of an exemplary supplemental mobile communication device.
Figure 2B:
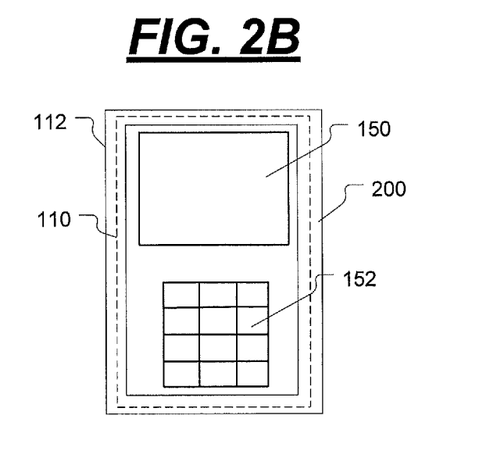
FIG. 2B illustrates the exemplary supplemental mobile communication device of FIG. 2A with a host device connected.

Turning now to FIGS. 2A and 2B, supplemental mobile device 112 is described in further detail. As described above, supplemental mobile device 112 may generally be a wireless device capable of facilitating voice and/or data communications over wireless network 130. Supplemental mobile device 112 may include a main body 200, and a radio module or transmitter 202 that is configured to selectively communicate via the wireless network 130.

Referring now also to FIG. 2B, a schematic illustration is shown of a supplemental mobile device 112 that is connected to a host device, specifically mobile device 110. In this example, the main body 200 may be shaped as a case or shell designed to fit over and/or around a host device(s) such as mobile device 110, while allowing access to a user interface, e.g., a display 150 and/or keypad 152, of the host device. The supplemental mobile device 112 may alternatively be configured to be installed onto a host device in any manner that is convenient, e.g., onto a back or side panel of the host device, or by way of any other connection, e.g., a standardized wired connection such as a USB cable, wireless connections such as Bluetooth, or any other standardized interface that is convenient. Further, the supplemental mobile device 112 may itself be sufficiently compact that it is capable of being received within a host device, e.g., a USB port, memory card expansion slot, battery bay, etc.

The supplemental mobile device 112 may further include an adapter module 204 that is in communication with the transmitter 202. The adapter module 204 is configured to selectively allow communication between the transmitter 202 and any one of a plurality of host devices that may be associated with a different wireless network, e.g. mobile device 110 that is associated with wireless network 120. Additionally, the supplemental mobile device 112 may include a separate communication adapter 204a, and a power adapter 204b that generally separate the functions of communication and power exchange between the supplemental mobile device 112 and a host device, e.g., mobile device 110. The supplemental mobile device 112 may thus be powered by the host device when plugged into the host device via the power adapter 204b of the adapter module 204. In other examples, the supplemental mobile device 112 may combine power and communication functionality in a single adapter module 204, for example a USB connection. The host device thereby is "plugged in" to the supplemental mobile device 112, with the adapter module 204 receiving a mating communication interface (not shown) of the host mobile device 110. For example, the mating communication interface may be a standardized connection interface, e.g., a USB port that receives a mating USB connector of the adapter module 204. However, any other forms of wired or wireless device-to-device communication may be employed, e.g., a USB-to-USB cable, Bluetooth, etc. Accordingly, the adapter module 204 generally allows a host device to selectively communicate via a wireless network 130 that is associated with the supplemental mobile device 112, as will be described further below.

The supplemental mobile device 112 also may include a memory module 206. Memory module 206 may include any features for providing a memory that is selectively accessible by the supplemental mobile device 112. Merely as examples, the memory module 206 may include a memory component that is physically and permanently installed to the main body, i.e., a RAM or hard drive module 206a. The memory module 206 may also include a removable memory bay 206b for receiving a removable memory device, e.g., a memory card.

As described above, the mobile device 110 is associated with the first network 120, and accordingly, when the mobile device 110 is not connected to the supplemental mobile device 112, may only directly initiate communications, such as phone calls or data transmissions, via the network 120. However, upon connecting the mobile device 110 as a host device to the supplemental mobile device 112, initiated communications, e.g., phone calls or data downloads, may be initiated with the host device that are transmitted via the second network 130 that is associated with the supplemental mobile device 112. The supplemental mobile device 112 may thus allow a host device such as the mobile device 110 to be used to communicate via the network 130 generally as if the host device were communicating via the network associated with the host device. Accordingly, a user interface (not shown), e.g., a numerical keypad, keyboard, or the like, of the mobile device 110 may be used to selectively initiate communications via the network 130 associated with the supplemental mobile device 112. Moreover, as described above, the user may communicate using the host device, e.g., mobile device 110, via either the network 120 that is associated directly with the mobile device 110, or via the network 130 that is associated with the supplemental mobile device 112.

Once the supplemental mobile device 112 is connected to a host device, e.g., mobile device 110, incoming communications such as phone calls to the host device and/or supplemental mobile device 112 may be handled in any manner that is convenient. For example, the supplemental mobile device 112 may include a distinct identity with respect to the communication network 130, e.g., a phone number, IP address, etc. Accordingly, when a host device 110 is connected to the supplemental mobile device 112 and one of the two networks 120, 130 is selected for use, any incoming communications via the other network may be forwarded or re-directed to the selected device. More specifically, where the supplemental mobile device 112 is selected, e.g., based upon a lower operating cost as compared with the mobile device 110, incoming phone calls to the mobile device 110 may be forwarded to the supplemental mobile device 112 to prevent accumulation of charges associated with the use of the network 120 associated with the mobile device 110.

Alternatively, the supplemental mobile device 112 may assume a communication device identity associated with the host device, e.g., a phone number of the mobile device 110, upon connection of the host device to the supplemental mobile device 112. For example, when the mobile device 110 is connected to the supplemental mobile device 112, the supplemental mobile device 112 and/or supplemental mobile device server 140 may detect an incoming communication to the mobile device 110 via the network 120 of the mobile device 120, and re-direct the incoming communication to the supplemental mobile device 112 via the network 130.

As the supplemental mobile device 112 may include a stand-along identity on the communication network 130, e.g., a phone number, the supplemental mobile device 112 may be used with any device configured to supply power to the supplemental mobile device 112, and is not limited to use only with mobile communication devices such as mobile device 110. For example, the supplemental mobile device 112 may be used in conjunction with any electronic device having an interface that mates with the adapter module 204 of the supplemental mobile device 112, e.g., personal digital assistants, MP3 players, etc. Accordingly, the supplemental mobile device 112 may generally allow electronic devices that do not otherwise include communication hardware and/or software to be used as mobile communication devices on the communication network 130.

Figure 3:
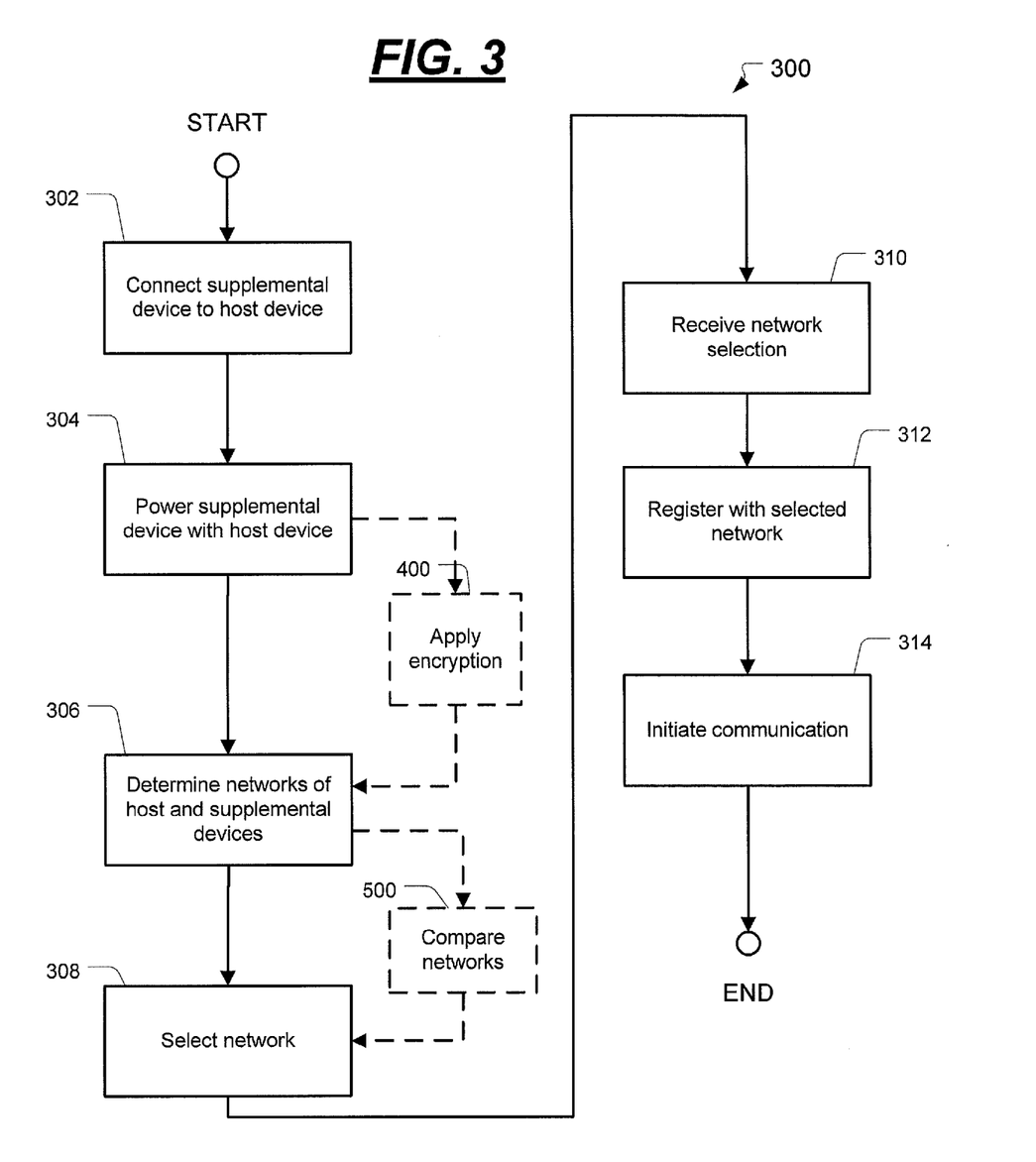
FIG. 3 illustrates an exemplary process for using a host device on a different network than is associated with the host device.

Proceeding now to FIG. 3, an exemplary process for communicating with a supplemental mobile device 112 is described. Process 300 may begin at block 302, where the supplemental mobile device 112 is connected to mobile device 110. For example, as described above the supplemental mobile device 112 may generally fit around mobile device 110 as a jacket or cover, receiving a host device, e.g. mobile device 110, therein while allowing for access to a user interface of the host device. Process 300 may then proceed to block 304.

In block 304, the supplemental mobile device 112 may receive power from the host mobile device 110. For example, as described above, the supplemental mobile device 112 may be plugged in to a power source provided by the host device 110, e.g., a USB plug that is received by the adapter module 204 of the supplemental mobile device 112.

As mentioned above, in some exemplary illustrations, the process 300 may allow for encryption of communications from supplemental mobile device 112, and by extension the mobile device 110. In these examples, process 300 may proceed from block 304 to a subprocess 400. An exemplary illustration of subprocess 400 is described in further detail in FIG. 4. As shown, subprocess 400 may begin at block 402, where an encryption profile or level associated with the supplemental mobile device 112 is determined. For example, block 402 may generally query whether a user profile associated with the supplemental mobile device 112 is a profile requiring encryption, e.g., that a user associated with the supplemental mobile device 112 is a member of the military or any other organization where encryption is desired.

Figure 4:
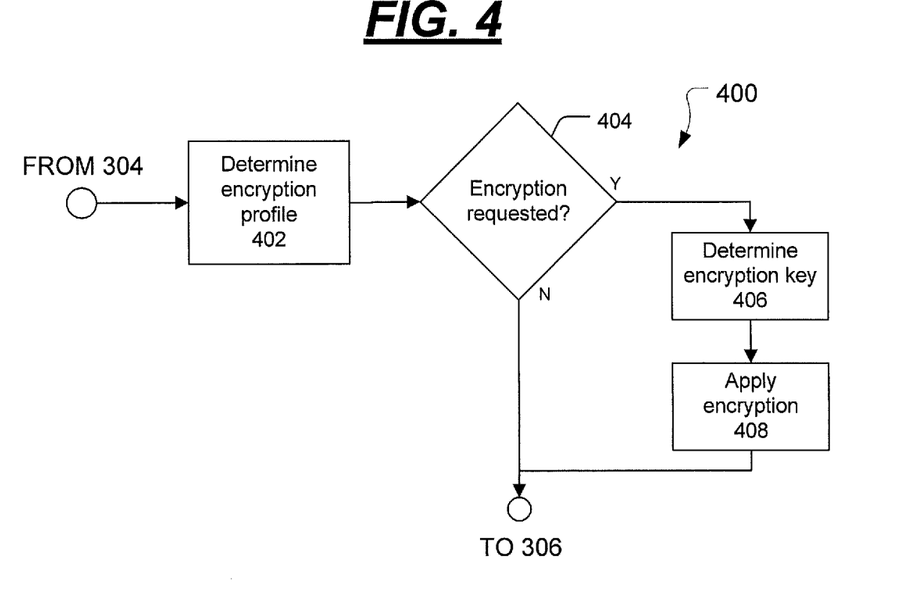
FIG. 4 illustrates an exemplary subprocess for providing encryption of communications between a host device and the network of a supplemental mobile communication device.

Proceeding to block 404, subprocess 400 may query whether the encryption profile indicates that encryption is necessary. If the result at block 404 is that no encryption is necessary, the subprocess 400 may conclude, proceeding to block 306 as described further below. Alternatively, if the profile determined in block 402 requires encryption, then subprocess 400 proceeds to block 406, where an encryption key is retrieved. For example, as described above, supplemental mobile device 112 may pull an encryption key from supplemental device server 140 according to an identity of a device with which the supplemental mobile device 112 is engaging in the communication desired for encryption. Alternatively, encryption keys and parameters may be stored directly by the supplemental mobile device 112, e.g., on memory module 206 of the supplemental mobile device 112, thereby allowing the supplemental mobile device 112 to determine an encryption key or scheme without external communication to/from the server 140. Proceeding to block 408 of subprocess 400, the encryption key is applied and the communication may begin between the supplemental mobile device 112 and the other device, e.g., mobile device 180. The subprocess 400 may then conclude, proceeding back to block 306 of the process 300.

At block 306, the networks of the host device, e.g., mobile device 110, and the supplemental mobile device 112 are determined. For example, any parameter associated with the different networks 120, 130 may be retrieved from supplemental server 140, e.g., associated with the service plans of the different networks 120, 130 that are associated with the mobile device 110 and supplemental mobile device 112. Accordingly, the supplemental mobile device 112 may initiate a communication to the mobile device 110 indicating the service provider associated with the supplemental mobile device 112, service plan details such as costs, capabilities of the networks associated with the service plans, etc.

Figure 5:
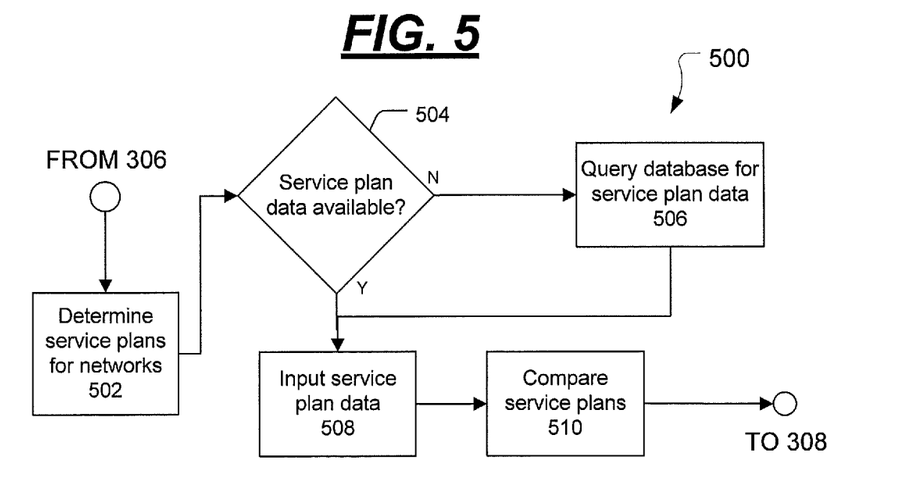
FIG. 5 illustrates an exemplary subprocess for comparing service networks of a host device and a supplemental mobile communication device.

As described above, the system 100 may provide for comparing available networks 120, 130 that are associated with the mobile device 110 and the supplemental mobile device 112. In these examples, the process 300 may proceed to subprocess 500, an exemplary illustration of which is shown in FIG. 5. Subprocess 500 may begin at block 502, where service plans are retrieved for each of the host device, e.g., mobile device 110, and the supplemental mobile device 112.

Proceeding to block 504, subprocess 500 queries whether data is available regarding service plan parameters associated with each of the devices 110, 112. For example, users of a supplemental mobile device 112 may provide data indicating various service plan parameters of any host device(s) that they may wish to use with the supplemental mobile device 112. Accordingly, where data has been provided to the supplemental mobile device 112 regarding the relevant service plans available to the combined host device and supplemental mobile device 112, subprocess 500 may proceed to block 508. Alternatively, if data is not directly accessible by the supplemental mobile device 112, e.g., is not already stored in memory module 206 of the supplemental mobile device 112 or in server 140, service plan information may be retrieved from a database associated with the relevant network 120, 130 for which service plan information is needed, as indicated at block 506. For example, the supplemental mobile device 112 may request service plan information from a database associated with the networks 120, 130 and or the service providers of the networks 120, 130.

Proceeding to block 508, the service plan information is provided to the supplemental mobile device 112. At block 510, any parameters of the available service plans may be compared, e.g., an operating cost associated with the host device and the supplemental mobile device 112 at the time of the request, a type of service being requested at that time, performance capability of the networks 120, 130 associated with the host device and supplemental mobile device 112, or any other comparison that is convenient. Subprocess 500 may then conclude, proceeding back to block 308 of process 300.

At block 308, the available networks may be displayed to a user of the combined host device and supplemental mobile device 112. For example, the network available to the host device, e.g., mobile device 110, may be displayed alongside the network that is available to the supplemental mobile device 112. Furthermore, in examples where a comparison has been made of any network parameters, e.g., as provided above in subprocess 500, the comparison of these parameters may also be displayed to indicate which of the available networks 120, 130 is cheaper to use, or includes certain performance requirements or services.

Proceeding to block 310, a selection of which network to use is received. For example, a user of the combined host device and supplemental mobile device 112 may select one of the networks displayed in block 308 through the user interface of the host device. Alternatively, a user may indicate that the selection should automatically occur according to a comparison, e.g., as described above in subprocess 500.

At block 312, the combined host device and supplemental mobile device 112 may register with the network selected at block 310. For example, where the network selected is that of the mobile device 110, the mobile device may register with the network 120 as it would normally, allowing communications or data transmissions to/from the mobile device 110. Alternatively, where the network selected is that of the supplemental mobile device 112, the supplemental mobile device 112 registers with the network 130, allowing communications or data transmissions to/from the supplemental mobile device 112.

Proceeding to block 314, a communication may be initiated with the host device, e.g., mobile device 110. For example, a user may initiate a phone call using a user interface, i.e., display 150 or keypad 152.

At block 316, an initiated communication, e.g., as initiated at block 314, may be selectively routed through the network selected at block 310. For example, where the network selected is the network 120 that is associated with the mobile device 110, the initiated communication may proceed according to the general operating parameters of the mobile device 110, as if the supplemental mobile device 112 was not being used in conjunction with the mobile device 110. Alternatively, where the network selected is the network 130 associated with the supplemental mobile device 112, the communication initiated with the mobile device 110 may be connected through the network 130 that is associated with the supplemental mobile device 112. Further, the initiated communication may be routed to the network that is selected based upon a comparison between the available networks using any parameter that is convenient, e.g., cost, network performance at the time of the communication. Accordingly, a user may use the network that is cheapest, has the greatest performance, e.g., largest data transmission capacity, has a certain type of service that is desired such as multimedia downloads, etc., of the available networks 120, 130. Communications initiated with the host device, e.g., mobile device 110, may thus be made on any network that is associated with the supplemental mobile device 112, and need not be limited to the network 120 that is associated with the mobile device. Process 300 may then terminate.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "the," etc. should be read to recite one or more of the indicated elements unless a claim recites an explicit limitation to the contrary.

What is claimed is:

1. A method comprising:
    establishing a mating communication interface between a mobile host device and a supplemental mobile device using an adapter located in the a supplemental mobile device;
    receiving an initiated communication from the mobile host device at the supplemental mobile device coupled directly via the mating communication interface, wherein the supplemental mobile device is associated with a first telecommunication network of a first service provider, and wherein the mobile host device is associated with a second telecommunication network of a second service provider;
    providing to a user, via a user interface of the mobile host device, a comparison of a first service plan associated with the first service provider with a second service plan associated with the second service provider, wherein the comparison includes a comparison of a first network performance of the first telecommunication network and a second network performance of the second telecommunication network;
    receiving, from the user, a selection of the first service plan based on the comparison;
    determining an encryption level of the supplemental mobile communication device;
    encrypting an outgoing communication according to at least the encryption level, wherein encrypting the outgoing communication includes establishing an encryption key, the encryption key including at least an identification of a second communication device to be in communication with the mobile host device;
    determining a routing decision to transmit the outgoing communication from the mobile host device to the supplemental mobile device and then through the first telecommunication network of the first service provider; and
    transmitting, via the supplemental mobile device, the outgoing communication from the mobile host device through the first telecommunication network of the first service provider, wherein the mobile host device is not authorized to directly communicate along the first telecommunication network via the second service provider.

2. The method of claim 1, wherein the first network performance includes a data transmission capacity of the first telecommunication network and the second network performance includes a data transmission capacity of the second telecommunication network.

3. The method of claim 1, further comprising:
    the supplemental mobile device assuming an identity of the mobile host device; and
    detecting, via the supplemental mobile device, an incoming communication to the mobile host device.

4. The method of claim 3, further comprising re-directing the incoming communication to the supplemental mobile device via the first telecommunication network.

5. The method of claim 1, further comprising powering the supplemental mobile device with the host device via the mating communication interface that couples the mobile host device to the supplemental mobile device.

6. The method of claim 1, wherein the supplemental mobile device is coupled to the mobile host device via a serial bus port mating interface.

7. A system, comprising:
    a supplemental mobile device having a mating interface and configured to:
        communicate with a first telecommunication network of a first service provider;
        establish a mating communication interface between a mobile host device and the supplemental mobile device using an adapter located in the a supplemental mobile device, wherein the mobile host device is associated with a second telecommunication network of a second service provider;
        provide, to the mobile host device, a comparison of a first service plan associated with the first service provider with a second service plan associated with the second service provider, wherein the comparison includes a comparison of a first network performance of the first telecommunication network and a second network performance of the second telecommunication network;
        receive, from the mobile host device, a selection of the first service plan;
        determine an encryption level of the supplemental mobile communication device;
        cause encryption of a communication initiated by the mobile host device according to at least the encryption level, wherein encryption of the communication includes establishment of an encryption key, the encryption key includes at least an identification of a second communication device to be in communication with the mobile host device;
        determine a routing decision to transmit the initiated communication from the mobile host device to the supplemental mobile device and then through the first telecommunication network of the first service provider; and
        transmit, via the supplemental mobile device, the initiated communication from the mobile host device through the first telecommunication network of the first service provider, and wherein the mobile host device is not authorized by the second service provider to directly communicate with the first telecommunication network.

8. The system of claim 7, wherein the supplemental mobile device is further configured to assume an identity of the mobile host device.

9. The system of claim 8, wherein supplemental mobile device is further configured to:
    detect an incoming communication to the mobile host device; and re-direct the incoming communication to the first telecommunication network of the first service provider to forward the incoming call to the supplemental mobile device.

10. The system of claim 7, wherein the first network performance of the first telecommunication network includes a data transmission capacity of the first telecommunication network and the second network performance of the second telecommunication network includes a data transmission capacity of the second telecommunication network.

11. The system of claim 7, wherein the supplemental mobile device is further configured to:
cause a user interface of the mobile host device to display available networks, wherein the available networks include the first telecommunication network of the first service provider and the second telecommunication network of the second service provider.

12. The system of claim 7, further including a supplemental device server that includes a processor, the first telecommunication network including the supplemental device server, wherein the supplemental device server is configured to compare the first service plan with the second service plan.

13. The system of claim 12, wherein the processor is configured to encrypt the communication initiated by the mobile host device.

14. The system of claim 7, wherein the supplemental mobile device is configured to provide the encryption key to the second communication device receiving the communication initiated by the mobile host device and transmitted by the supplemental mobile device.

15. The system of claim 7, further including a supplemental device server that includes a processor, wherein the supplemental device server provides the encryption key to the second communication device receiving the communication initiated by the mobile host device, and wherein the encryption key includes at least an identification of the supplemental mobile device and an identification of the second communication device.

16. The system of claim 7, wherein the supplemental mobile device is configured to be selectively powered by the mobile host device.

17. The system of claim 7, wherein the mating communication interface includes a serial bus port interface configured to directly connect the supplemental mobile device to the mobile host device, thereby facilitating communication from the supplemental mobile device to the mobile host device.

18. The system of claim 7, wherein the supplemental mobile device is configured to couple to any of a plurality of mobile host devices and route outgoing communications of the any of the plurality of host devices through the first telecommunication network, and wherein each of the plurality of mobile host devices is not authorized to directly communicate along the first telecommunication network.

19. The system of claim 7, wherein the supplemental mobile device is configured to assume a distinct identity from the mobile host device upon connection of the mobile host device to the supplemental mobile device.

20. The system of claim 7, wherein the mating communication interface comprises a wireless connection.

21. The system of claim 7, wherein the mating communication interface comprises a wired connection configured to physically connect the mobile host device to the supplemental mobile device.

22. The system of claim 7, wherein the supplemental mobile device is configured to fit at least partially around the mobile host device.

* * * * *